April 10, 1962  R. K. CATTERSON  3,028,848
INTERNAL COMBUSTION ENGINE GOVERNOR

Filed July 1, 1960  3 Sheets-Sheet 1

INVENTOR
Robert K. Catterson

April 10, 1962 R. K. CATTERSON 3,028,848
INTERNAL COMBUSTION ENGINE GOVERNOR
Filed July 1, 1960 3 Sheets-Sheet 2
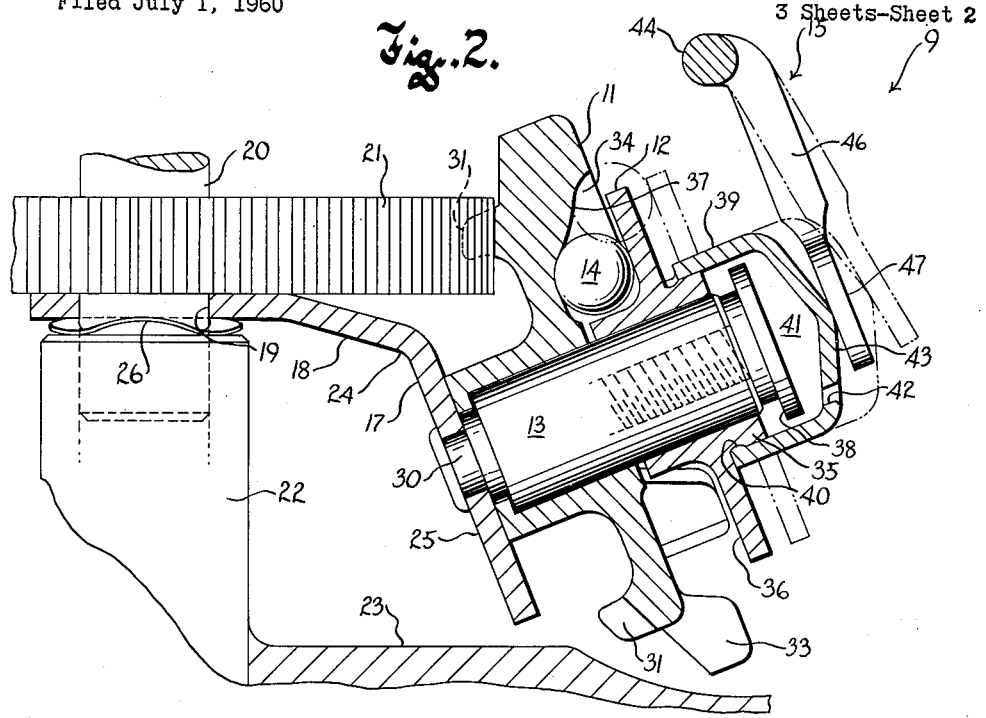
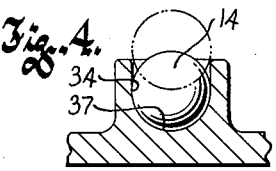
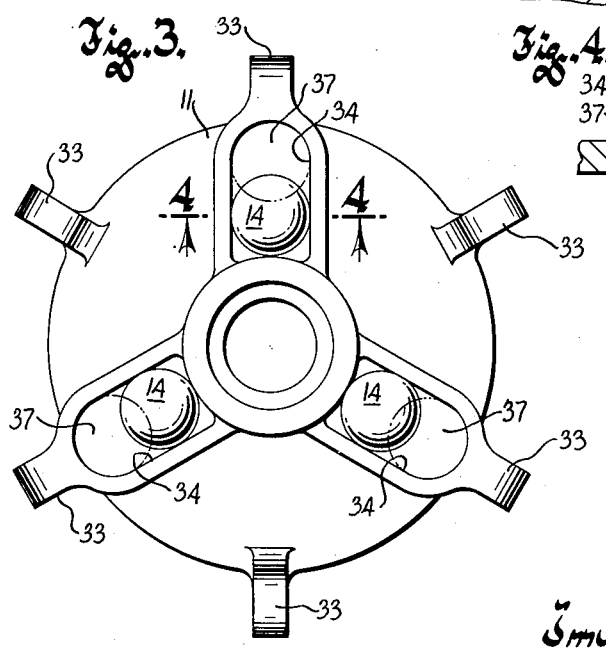
Robert K. Catterson April 10, 1962   R. K. CATTERSON   3,028,848
INTERNAL COMBUSTION ENGINE GOVERNOR
Filed July 1, 1960   3 Sheets-Sheet 3
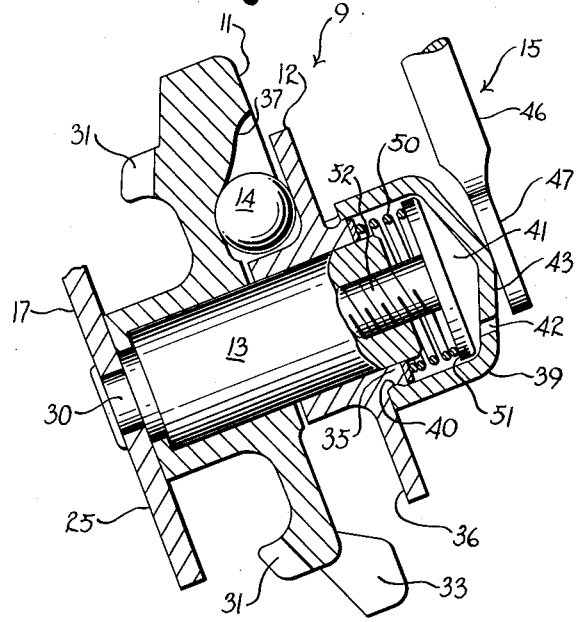
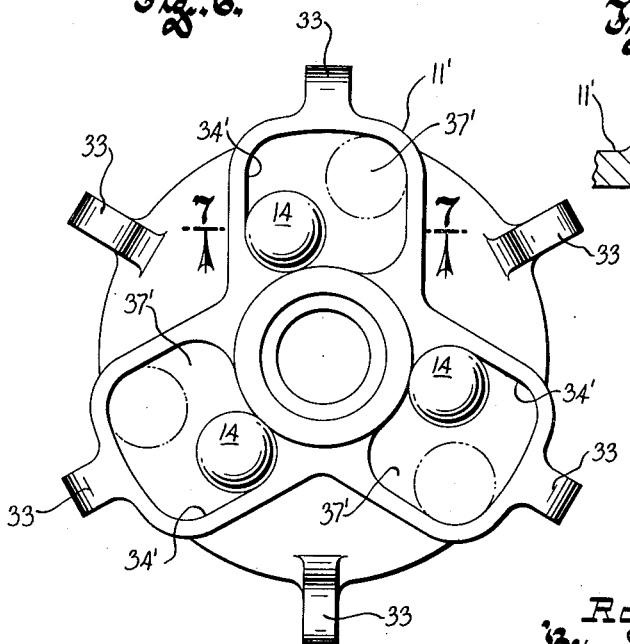
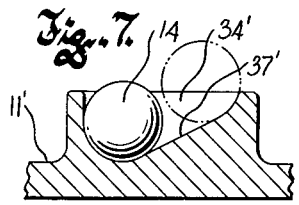

United States Patent Office 3,028,848
Patented Apr. 10, 1962

3,028,848
INTERNAL COMBUSTION ENGINE GOVERNOR
Robert K. Catterson, Brookfield, Wis., assignor to Briggs & Stratton Corporation, Milwaukee, Wis., a corporation of Delaware
Filed July 1, 1960, Ser. No. 40,255
10 Claims. (Cl. 123—108)

This invention relates to governors for reciprocating internal combustion engines by which the position of the engine throttle is automatically adjusted to maintain a predetermined speed of crankshaft rotation, and the invention refers more particularly to an inexpensive centrifugally responsive governor mechanism which is particularly well adapted for use on small gasoline engines.

On internal combustion engines used on rotary power lawn mowers it has been found desirable, in the interests of safety, to provide a governor which keeps the speed of the engine, and hence of the cutting blade, from exceeding a predetermined safe maximum limit when the blade is not encountering cutting resistance. One form of governor which has been commonly used for this purpose comprises an air pressure responsive vane linked with the throttle control of the engine and mounted in the stream of cooling air from the engine's blower to be moved by variations in the velocity of the cooling air flow. While inexpensive and relatively dependable, the air vane type of governor had certain important disadvantages. Obviously, the movement of the pressure responsive vane was in response to changes in the speed of the engine only to the extent that the flow of air across the vane was a direct function of blower fan velocity; but the vane could also be moved by wind and other influences not related to engine speed. Moreover, the working parts of the air vane governor were mounted at the exterior of the engine, where they presented some lubrication problems and could accumulate dirt and foreign matter which would interfere with proper functioning of the governor.

By contrast with the air vane governor which has heretofore been widely used on small engines, it is an object of this invention to provide an accurate, inexpensive and reliable governor for such engines comprising a centrifugally responsive mechanism which is mounted in the interior of the engine crankcase so as to be protected from dirt and foreign matter and which is gear driven from the engine crankshaft so as to be directly affected by variations in the rotational speed of the crankshaft without being influenced by conditions which are unrelated to engine speed.

Another object of this invention resides in the provision of a centrifugally responsive governor for an internal combustion engine which is assured of proper lubrication at all times by reason of the fact that the moving parts of the centrifugally responsive mechanism are housed in the engine crankcase and are thus constantly exposed to the lubricating oil in the engine.

A more specific object of this invention resides in the provision of an internal combustion engine governor having centrifugally responsive mechanism housed in the engine crankcase and incorporating simple and inexpensive damping or dashpot means that utilizes lubricating oil in the crankcase to prevent hunting of the governor and thus insures the stables maintenance of a predetermined engine speed.

A very important object of this invention is to provide a governor for an internal combustion engine wherein one of the movable elements of the centrifugally responsive mechanism of the governor comprises a rotary oil slinger of the type described and claimed in the patent to Hugh S. Brown, No. 2,669,322, which is mounted inside the engine crankcase and is gear driven from the crankshaft.

This type of oil slinger has come into widespread use in vertical crankshaft single cylinder four-cycle engines used in rotary power lawn mowers, as the means for distributing lubricating oil from the crankcase sump or oil reservoir to the moving parts inside the engine, and it is thus apparent that the present invention also has as one of its objects the provision of a centrifugally responsive engine governor mechanism which is especially inexpensive and compact because it utilizes an existing element in the engine as one of its working members.

More specifically, it is another object of this invention to provide a centrifugally responsive governor mechanism for an internal combustion engine having an oil slinger of the character described wherein the oil slinger has means thereon providing grooves or pockets in which centrifugally responsive balls are confined for orbital revolution with and radial motion relative to the oil slinger, and wherein a simple and inexpensive ball follower, axially slidable on the same shaft with the oil slinger, cooperates with the oil slinger to confine the balls to such motion and serves as a work performing element by which an axial component of radial motion of the balls is transmitted to linkage connected with the throttle of the engine.

Another specific object of this invention resides in the provision of a cap-like damping member which is secured to the ball follower for axial motion therewith and which serves as a dashpot to inhibit excessive axial motion of the ball follower and thus prevents hunting, and which also serves to transmit axial motion of the ball follower to a lever or other motion transmitting member that extends through a wall of the engine crankcase and is linked with the throttle.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

FIGURE 2 is a fragmentary sectional view taken on the plane of the line 2—2 in FIGURE 1;

FIGURE 3 is a plan view of the front face of the oil slinger in the governor of this invention;

FIGURE 4 is a fragmentary sectional view taken on the plane of the line 4—4 in FIGURE 3;

FIGURE 5 is a sectional view somewhat similar to

Figure 1:
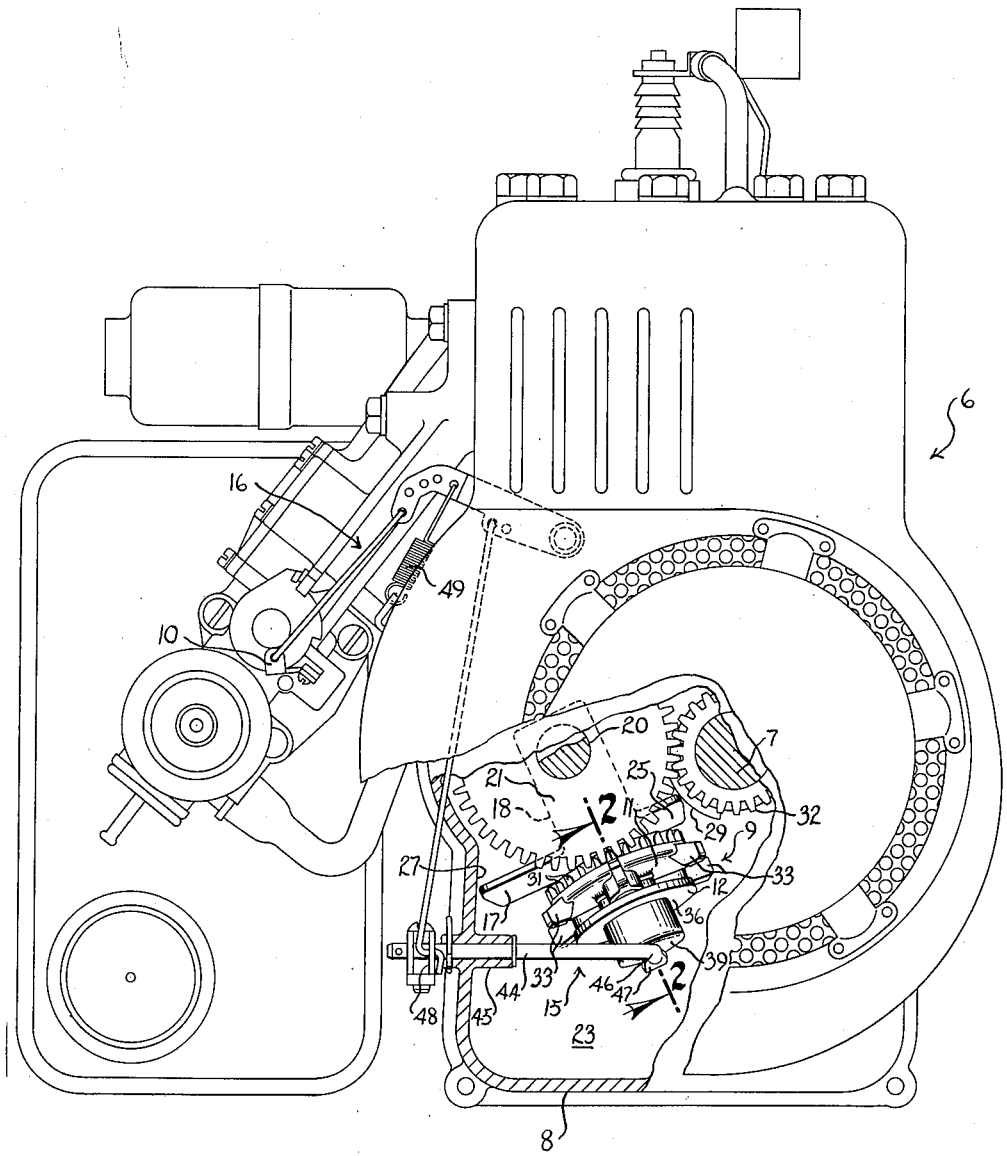
FIGURE 1 is a top view of an engine on which the governor of this invention is installed, portions of the engine being broken away to show the centrifugally responsive governor mechanism.

FIGURE 2, but showing a modified form of the centrifugally responsive governor mechanism;

FIGURE 6 is a plan view of the front face of a modified form of oil slinger which can be used with the governor of this invention; and FIGURE 7 is a fragmentary sectional view taken on the plane of the line 7—7 in FIGURE 6.

Referring now more particularly to the accompanying drawings, the numeral 6 designates generally a single cylinder internal combustion engine having a crankshaft 7 rotatable on a vertical axis in a crankcase 8 that provides a reservoir or sump in which is held a supply of lubricating oil for the engine. The engine is equipped with a centrifugally responsive governor mechanism 9 of this invention, which is housed in the engine crankcase 8 and which automatically controls the position of the customary throttle lever 10 by which the speed of crankshaft rotation can be regulated, so as to maintain a predetermined maximum engine speed.

The governor mechanism 9 comprises, in general, a pair of retainer elements 11 and 12, coaxially mounted on a shaft 13, which cooperate to confine a plurality of centrifugally responsive balls 14 to orbital revolution around the shaft axis and to centrifugally responsive radial motion relative to the shaft axis. Axial motion of the retainer element 12, produced by centrifugally responsive motion of the balls 14, is transmitted to the throttle lever 10 by means of a motion transmitting member 15, pivotally fulcrumed in a wall of the crankcase and connected with the throttle lever by means of a conventional linkage 16.

The shaft 13 on which the retainer elements 11 and 12 are mounted is carried by a bracket 17 which is fixed in the crankcase of the engine. The bracket, which is stamped or otherwise formed from flat material, is substantially T-shaped and its stem portion 18 has a hole 19 near its outer end through which the cam shaft 20 extends. The stem portion 18 of the bracket is confined between the hub of the cam gear 21 and the top of a boss 22 which projects upwardly from the bottom wall 23 of the crankcase and in which the lower end portion of the cam shaft is rotatably journaled. A wave spring washer 26, confined between the stem portion 18 of the bracket and the top of the boss 22 urges the bracket into contact with the hub of the cam gear to hold the bracket against movement axially of the cam shaft. The stem portion of the bracket is bent obliquely downwardly, as at 24, to dispose the surface of its laterally extended lower portion 25 obliquely to the crankshaft axis. Cooperating with the cam shaft and the washer 26 to fix the bracket in the crankcase, the ends of the head of the T which form the side edges of the lower portion of the bracket are respectively engaged against a side wall 27 of the crankcase and against the side of a boss 29 in which the crankshaft 7 is journaled.

The governor shaft 13 preferably has a reduced diameter portion 30 at its inner end which is engaged in a closely fitting hole in the lower portion 25 of the bracket and peened over to secure the shaft to the bracket with its axis normal to the lower portion of the bracket and thus at an oblique angle to the crankshaft axis.

The retainer element 11 comprises a rotary oil slinger generally similar to that of the aforesaid Brown patent, by which oil in the lower portion of the crankcase is picked up and thrown against the moving parts inside the engine. The oil slinger is freely rotatable on the shaft 13, near the fixed inner end of the latter, and because of the inclination of the axis of the shaft 13 the slinger is normally partway immersed in the oil in the crankcase.

The driving connection between the crankshaft and the oil slinger is provided by gear teeth 31 on the rear face of the slinger, which in this case are meshingly engaged with the teeth of the cam gear 21 that is driven from the timing gear 32 on the crankshaft; but obviously the gear teeth 31 on the oil slinger could be directly engaged with the timing gear 32 or with a suitable crankshaft driven idler gear. Paddles 33 on the oil slinger, at circumferentially spaced intervals around it, pick up oil and throw it against the moving parts of the engine as the slinger rotates.

The centrifugally responsive balls 14 are constrained to orbital revolution about the axis of the shaft 13 by reason of the fact that the front face of the oil slinger has radially elongated, axially outwardly opening ball grooves or pockets 34, in each of which one of the balls 14 is rollingly confined by the retainer element 12.

The retainer element 12 comprises a ball follower or work performing member having a hub portion 35 which is freely rotatable and slidable back and forth on the outer end portion of the shaft 13, and a circumferential flange 36 which projects radially from the hub portion, intermediate the ends thereof, and which opposes the pocketed front face of the oil slinger and engages the balls 14.

As best seen in FIGURE 2, the bottom surface 37 of each ball pocket 34 is inclined axially and radially outwardly so as to be disposed at an oblique angle to the axis of the oil slinger. The width of each ball pocket (see FIGURE 4) is such that the ball confined therein is substantially constrained against circumferential motion relative to the oil slinger, and the groove is semicircular in cross section so that the ball is free to roll lengthwise of it (radially relative to the oil slinger) in response to centrifugal force.

As the balls move radially outwardly in the pockets they receive an axial component of motion due to the inclination of the bottom surfaces 37 of the pockets, and they of course transmit such axial motion to the flange-like retainer portion 36 of the ball follower by reason of the fact that the latter is at all times maintained in engagement with them. The outer limit of axial movement of the ball follower on the shaft 13 is defined by an enlarged head 38 on the outer end of the shaft that provides an axially inwardly facing shoulder which opposes and is engageable by the hub portion 35 of the follower.

The connection between the ball follower or work performing member 12 and the motion transmitting member 15 comprises a cup-shaped cap or damping member 39 which is secured to the hub portion 35 of the ball follower and which also serves as a dashpot to prevent hunting of the governor mechanism. The cap is preferably formed from nylon or a similar somewhat resilient plastic material and has on its inner surface, near its rim, small radially inwardly projecting circumferential ribs 40 that engage in a circumferential groove in the hub portion 35 of the ball follower to fasten the cap to the follower. The resilience of the cap of course permits these ribs to be readily snapped over the outer end portion of the follower hub and into the groove during assembly of the mechanism.

The cap or damping member 39 cooperates with the hub portion 35 of the ball follower and with the outer end portion of the shaft 13 to provide a small chamber 41, the volume of which varies with the axial position of the ball follower on the shaft. An orifice 42 in the end wall 43 of the cap allows oil from the engine crankcase to bleed into and out of this chamber at a rate which effects damping of the axial motion of the cap and the ball follower to which it is attached, to thus prevent hunting and enable the governor to maintain a uniform and constant engine speed.

The motion transmitting member 15, by which the centrifugally responsive governor mechanism 9 is connected with the linkage 16 that actuates the engine throttle lever 10, comprises a shaft portion 44 that extends through and is rotatably journaled in an integral boss 45 on the side wall 27 of the engine crankcase. Integral with this shaft portion, and extending laterally from it inside the crankcase, is a lever arm 46 having a paddle-shaped end portion 47 which bears against the cap 39. Preferably the end wall 43 of the cap is conical, or is otherwise formed to a substantially small coaxial tip portion which has only point contact with the paddle-shaped end portion 47 of the lever arm 46 so as to minimize rotational friction between the cap and said arm. It will be understood that the ball follower and cap are not rotatably driven but that they do tend to rotate with the oil slinger by reason of their connection with it through the balls 14, and that any impedance to rotation of the ball follower would accordingly tend to retard rotation of the oil slinger.

A laterally extending arm 48 secured on the outer end portion of the shaft 44 swings in consequence of rotation of said shaft, in unison with motion of the inner paddle-like arm 46, and the motion of the ball follower 12 is thus transmitted to the throttle lever 10 through the linkage 16, which is connected to the outer arm 48. A tension spring 49, connected between the linkage 16 and a fixed part on the engine, biases the throttle toward its closed position and, through the linkage, also biases the motion transmitting member 15 in the direction to swing its inner arm 46 into engagement with the cap 39. It will be seen that the biasing force thus exerted upon the arm 46 is transmitted to the ball follower 12 to urge it toward the oil slinger and thereby cam the balls 14 radially inwardly in their pockets.

In the modified form of the governor of this invention illustrated in FIGURE 5 the ball follower 12 is directly biased toward the pocketed face of the oil slinger 11 by means of a coiled compression spring 50 that reacts between the hub portion 35 of the follower and the underside of a large head 51 of a screw 52 that is coaxially threaded into the outer end of the shaft 13. It will be apparent that the biasing force of the spring 50 can be regulated by axial adjustment of the screw 52. Moreover, governing action will be improved by this arrangement since there is no possibility that friction in the linkage will interfere with the biasing force upon the ball follower.

In the embodiment of the invention shown in FIGURES 6 and 7 the ball grooves or pockets 34' in the outer face of the oil slinger 11' are wide enough to allow the balls 14 to have a substantial amount of circumferential motion relative to the oil slinger so that the balls can be directly responsive to rotational acceleration and deceleration of the oil slinger. As best seen in FIGURE 7, the bottom surface 37' of each ball groove is inclined circumferentially in the direction opposite to that of slinger rotation and axially outwardly. Hence, during accelerating rotation of the oil slinger, each ball 14, due to its inertia, moves relatively in the direction opposite to that of oil slinger rotation, climbing the inclined bottom surface of the ball groove and moving the ball follower axially outwardly to affect a readjustment of the throttle by which the engine is slowed down.

Because the balls are more quickly responsive to tangential acceleration than to centrifugal force, the modified form of oil slinger just described is more responsive to slight changes in engine speed than the centrifugally responsive mechanism illustrated in FIGURES 3 and 4. However, since the circumferential or tangential motion of the balls due to acceleration and deceleration is usually small, the ball pockets 34' are preferably also radially elongated and their bottom surfaces are inclined radially and axially outwardly as in the previously described version of the invention, so that the balls can respond to centrifugal force as well as rotational acceleration and deceleration.

From the foregoing description taken together with the accompanying drawings it will be apparent that this invention provides a centrifugally responsive governor mechanism which is particularly well adapted for small internal combustion engines, and especially small engines having vertical crankshafts, of the type adapted for installation on power lawn mowers, which governor mechanism is very compact and inexpensive by reason of the fact that it incorporates as one of its elements an oil slinger which provides for lubrication of the moving parts inside the engine. It will also be apparent that the governor of this invention provides very accurate speed regulation by reason of the fact that it is a centrifugally responsive mechanism driven from the engine crankshaft and therefore not subject to extraneous influences not related to engine speed, and it is very dependable because it is enclosed in the engine crankcase where it is protected from dirt and foreign matter and is constantly lubricated by the oil supply in the engine.

What is claimed as my invention is:

1. In an internal combustion engine having adjustable speed regulating means and having a crankcase which provides a sump for lubricating oil and in which a crankshaft is rotatable, means for lubricating the moving parts in the engine and for automatically adjusting the speed regulating means to maintain a predetermined speed of crankshaft rotation, comprising: a disc-like oil slinger mounted in the crankcase for rotation about a fixed axis and drivingly connected with the crankshaft, said oil slinger having a plurality of circumferentially spaced apart paddles for throwing oil in the crankcase against moving parts in the engine as the oil slinger rotates and also having a plurality of radially elongated ball grooves in one axial face thereof, the bottom surfaces of which are inclined radially and axially outwardly relative to the oil slinger axis; journal means coaxial with the oil slinger and projecting beyond said one face thereof; a ball follower having a hub portion mounted on said journal means for axial motion between defined limits relative to the oil slinger, and having a circumferential flange fixed to and projecting radially from its hub portion and opposing said face of the oil slinger; a ball rollingly seated in each ball groove in the oil slinger and confined therein by said flange on the ball follower, each of said balls being movable radially outwardly in its groove in response to centrifugal force due to rotation of the oil slinger and by its engagement with the ball follower transmitting to the latter its axial component of motion due to the inclination of the bottom of the ball groove; and means including a part extending through a wall of the crankcase providing a motion transmitting connection between the ball follower and the engine speed regulating means.

2. The internal combustion engine of claim 1, further characterized by the fact that each of said ball grooves in the oil slinger is sufficiently wider than the ball seated therein to permit the ball to have limited circumferential motion relative to the oil slinger; and by the fact that the bottom of each ball groove is inclined axially and circumferentially outwardly relative to the oil slinger axis so that the balls have an axial component of motion, which they transmit to the ball follower, as a result of rotational acceleration and deceleration of the oil slinger.

3. In an internal combustion engine having an adjustable speed regulating means and having a crankcase which provides a sump for lubricating oil and in which a crankshaft is rotatable, means for lubricating the moving parts in the engine and for automatically adjusting the speed regulating means to maintain a predetermined speed of crankshaft rotation, comprising: a disc-like oil slinger member mounted in the crankcase for rotation about a fixed axis and drivingly connected with the crankshaft, said oil slinger having a plurality of circumferentially spaced apart paddles for throwing oil in the crankcase against moving parts in the engine as the oil slinger member rotates, said oil slinger member also having a plurality of radially extending ball grooves in one axial face thereof; journal means coaxial with the oil slinger and projecting beyond said one face thereof; a follower member mounted on said journal means for axial back and forth motion relative to the oil slinger and having a circumferential substantially radially extending retainer portion coaxial with the oil slinger member and which faces the bottoms of the pockets in the same; a ball in each of the pockets in the oil slinger member, confined between the oil slinger member and the retainer portion of the follower member and constrained thereby to rotation with and centrifugally propelled radial motion relative to the oil slinger member; means on one of said members providing a surface rollingly engaged by each ball and which is so inclined with respect to the axis of said member that radial outward motion of the balls is translated into axial motion of the follower member in one direction; and means including a part extending through a wall of the crankcase providing a motion transmitting connection between the follower member and the engine speed regulating means.

4. In a reciprocating engine having a crankshaft and a crankcase in which lubricating oil is held and an adjustable speed regulating means, a governor of the type wherein balls are confined between a pair of coaxially mounted retainer elements, one of which is rotatable and constrains the balls to rotation with it but permits centrifugally responsive motion of the balls relative to it, and the other of which elements is axially moved by such centrifugal response of the balls, said governor being characterized by the fact that: said rotatable retainer element comprises an oil slinger mounted inside the crankcase, having a geared rotation transmitting connection with the crankshaft and having paddles by which oil in the crankcase is thrown against moving parts of the engine as the slinger rotates; further characterized by the fact that said oil slinger has radially elongated ball pockets in its face opposing the other retainer element, which pockets open to said other retainer element and constrain the balls to revolve orbitally with the oil slinger but permit them to have limited motion radially relative to the oil slinger; and further characterized by a motion transmitting element which extends through a wall of the crankcase and provides a connection between the axially movable retainer element and the speed regulating means.

5. A reciprocating internal combustion engine having a rotatable oil slinger in its crankcase, drivingly connected with its crankshaft, for throwing oil against moving parts in the engine as the crankshaft rotates, and having a governor by which speed regulating means on the engine is adjusted to maintain a predetermined speed of crankshaft rotation, and which governor is of the type comprising a pair of opposed coaxial elements, one of which is adapted to be moved axially in consequence of radial motion of a plurality of balls confined between said elements for orbital revolution concentric to the axis of the elements and motion radially relative to the elements in response to centrifugal force, said engine being characterized by that fact that: the other of said opposed coaxial elements of the governor comprises the oil slinger; and further characterized by a motion transmitting member movably mounted in a wall of the engine crankcase and having one portion projecting into the interior of the crankcase and connected with said one element to be moved thereby, and having another portion which projects outside the crankcase and is operatively connected with the engine speed regulating means.

6. In a reciprocating engine having adjustable speed regulating means and a crankcase with a crankshaft therein, a governor connected with the speed regulating means of the type having a pair of retainer elements coaxially mounted in the crankcase and a plurality of balls confined between the retainer elements for orbital revolution concentric to the axis of the retainer elements and for centrifugally responsive radial motion relative to said retainer elements by which one of said elements is moved axially, said governor being characterized by the fact that the other of said retainer elements comprises: an oil slinger drivingly connected with the engine crankshaft to be rotated thereby and having a plurality of radially extending paddles adapted to pick up oil in the crankcase and throw it against moving parts in the engine; and means at one face of the oil slinger, constrained to coaxial rotation therwith, defining a plurality of substantially radially extending axially opening grooves, in each of which a ball is adapted to be rollingly seated and by which the ball is constrained to orbital motion but is left free for centrifugal responsive radial motion.

7. In a speed responsive governor mechanism for a reciprocating engine having speed regulating means, of the type wherein a rotatable member mounted on a stub shaft fixed in the engine crankcase and drivingly connected with the crankshaft carries centrifugally responsive elements in orbital motion and so constrains the motion of said elements in response to centrifugal force that they produce a force in one direction along the axis of the rotatable member: a motion transmitting member movably mounted in a wall of the crankcase and extending to the exterior thereof for connection with the speed regulating means; and means for imparting said force in one direction to the motion transmitting member and for damping the response of the motion transmitting member to prevent hunting, said means comprising a follower having a hub portion closely fitting the end portion of the stub shaft around the entire circumference thereof, but rotatable and movable axially back and forth thereon, and having a substantially radially projecting circumferential portion which is engaged against the centrifugally responsive elements to be moved axially in consequence of their centrifugally responsive motion, and a cap-like enclosure means secured on the hub portion of the follower for axial movement therewith and cooperating with the follower and with the end portion of the shaft to define an enclosed chamber the volume of which varies with the axial position of the follower on the shaft, said enclosure means having an orifice through which oil can bleed into and out of said chamber to exert a damping effect upon axial motion of the follower, and said enclosure means having a coaxial tip of small area against which the motion transmitting member is engaged so that axial motion of the follower is transmitted to the motion transmitting member without creating rotation retarding friction between the enclosure means and the motion transmitting member.

8. The apparatus of claim 7, further characterized by means on said end of the shaft providing a circumferential shoulder which axially faces the hub portion of the follower; and a coiled compression spring reacting between said shoulder and the hub portion of the follower to bias the follower into engagement with the centrifugally responsive members.

9. The apparatus of claim 8, further characterized by the fact that said means on the shaft comprises the head of a screw coaxially threaded into the shaft and which is axially adjustable relative to the shaft for regulating the biasing force which the spring exerts upon the follower.

10. In a governor of the type which is mounted inside the crankcase of an internal combustion engine having speed adjusting means and which includes a work performing element mounted on a shaft, near one end thereof, for axial movement in one direction along the shaft in consequence of centrifugally responsive radial motion of orbitally movable members driven from the engine crankshaft, means for damping axial motion of the work performing element and for operatively connecting it with a motion transmitting member which is connected with the speed adjusting means and which is movably mounted in a wall of the engine crankcase, said means comprising: a cap-like closure member secured on the work performing element with its end wall extending over said end of the shaft, said closure member cooperating with the shaft and the work performing element to define an enclosure, the volume of which varies with the axial position of the work performing element on the shaft, and said closure member having an orifice therein through which oil can bleed into and out of said enclosure to thus exert a damping effect upon axial motion of the work performing element; and said enclosure member having a substantially pointed coaxial tip on its end wall which bears against a portion of the motion transmitting member that is inside the engine crankcase.

References Cited in the file of this patent

UNITED STATES PATENTS

| | | |
|---|---|---|
| 1,104,119 | Horning | July 21, 1914 |
| 1,480,309 | Short et al. | Jan. 8, 1924 |
| 1,654,963 | Crawford | Jan. 3, 1928 |
| 1,924,228 | Bull | Aug. 29, 1933 |
| 2,292,805 | Tippen | Aug. 11, 1942 |
| 2,382,952 | Armstrong | Aug. 21, 1945 |
| 2,603,472 | Adler | July 15, 1952 |

FOREIGN PATENTS

| | | |
|---|---|---|
| 503,072 | Canada | May 25, 1954 |